United States Patent [19]

Stultz

[11] Patent Number: 5,726,802
[45] Date of Patent: Mar. 10, 1998

[54] BROADBAND QUARTER-WAVE RETARDING 180° FOLD PRISM

[75] Inventor: Robert D. Stultz, Bellflower, Calif.

[73] Assignee: Hughes Electronics, Los Angeles, Calif.

[21] Appl. No.: 589,721

[22] Filed: Jan. 22, 1996

[51] Int. Cl.⁶ .............................. G02B 5/30; G02B 27/28
[52] U.S. Cl. ................... 359/487; 359/494; 359/500; 359/834; 372/100
[58] Field of Search ........................ 359/483, 487, 359/494, 496, 500, 834, 835, 836; 372/100

[56] References Cited

U.S. PATENT DOCUMENTS

| | | | |
|---|---|---|---|
| 2,211,238 | 8/1940 | Links | 359/836 |
| 2,409,407 | 10/1946 | Turner | 359/834 |
| 3,649,931 | 3/1972 | Macek . | |
| 3,924,201 | 12/1975 | Crow | 372/100 |
| 4,090,775 | 5/1978 | Lobb . | |
| 4,514,047 | 4/1985 | Haskal et al. | 359/487 |
| 4,525,034 | 6/1985 | Simmons . | |
| 4,740,986 | 4/1988 | Reeder | 372/100 |
| 4,822,150 | 4/1989 | Duarte | 359/487 |
| 4,930,878 | 6/1990 | Bergner et al. | 359/487 |

FOREIGN PATENT DOCUMENTS

| 76587 | 6/1981 | Japan | 372/100 |
|---|---|---|---|

*Primary Examiner*—Ricky D. Schafer
*Attorney, Agent, or Firm*—Georgann S. Grunebach; Gordon R. Lindeen III; Wanda K. Denson-Low

[57] ABSTRACT

An optical device comprising a glass prism that functions as a 180° fold prism and a quarter-wave retarder. The optical device comprises a 180° folding glass prism having first and second total internal reflecting surfaces that provides a 90° phase shift of laser energy at a plurality of wavelengths propagating therethrough. The composition of the glass prism is selected so that its refractive index provides a 45° shift at each of first and second total internal reflecting surfaces. Dispersion in the glass is chosen to be small enough so that the phase shift of the energy propagating therethrough is relatively insensitive to wavelength. Consequently, the prism also functions as a quarter-wave retarder at the plurality of wavelengths.

10 Claims, 3 Drawing Sheets

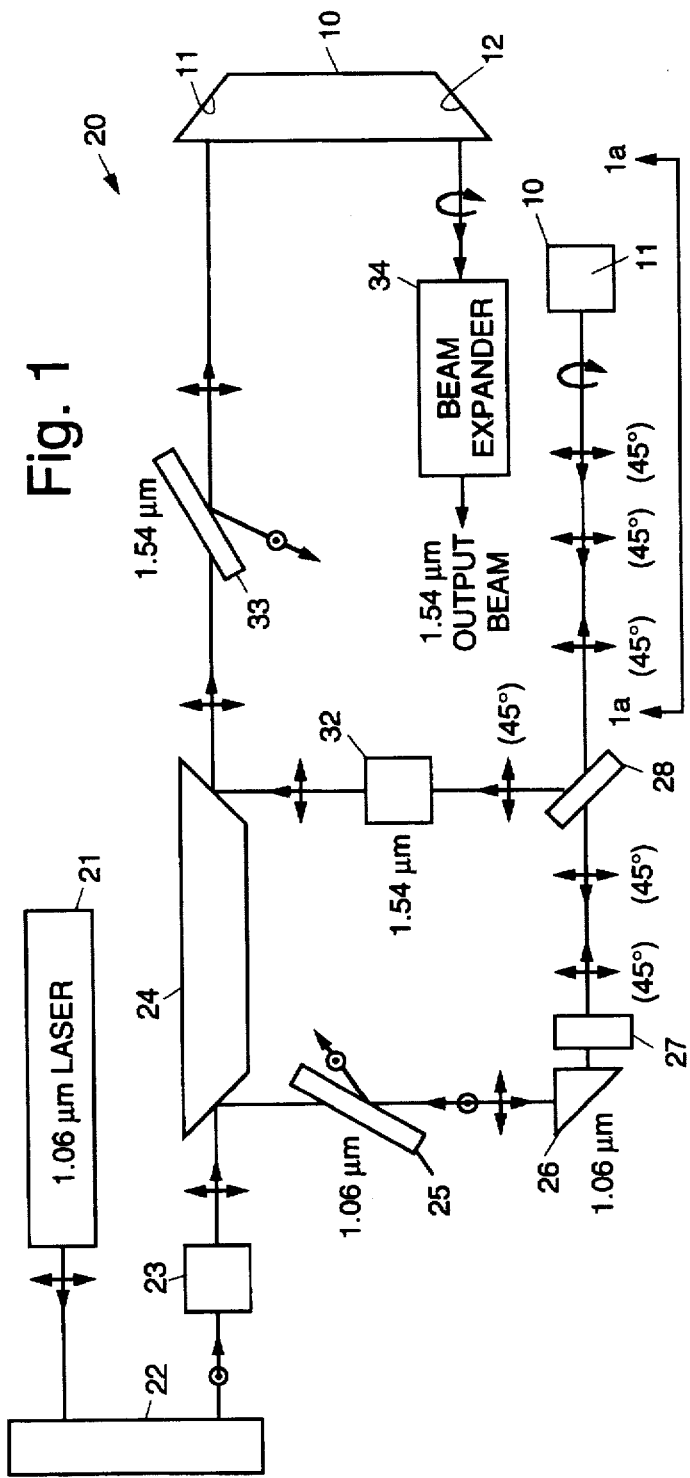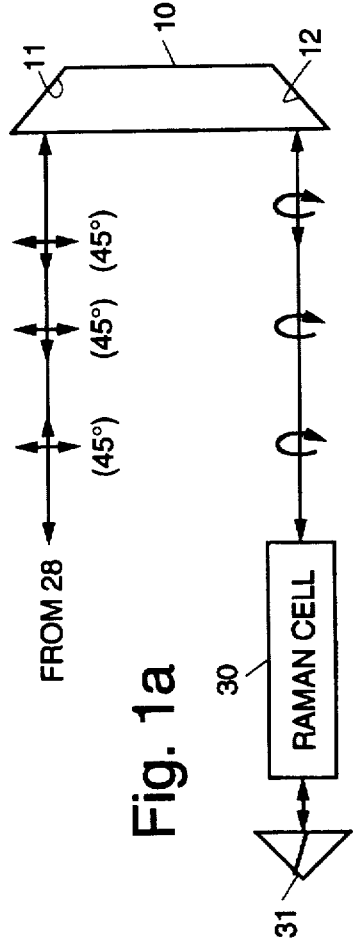

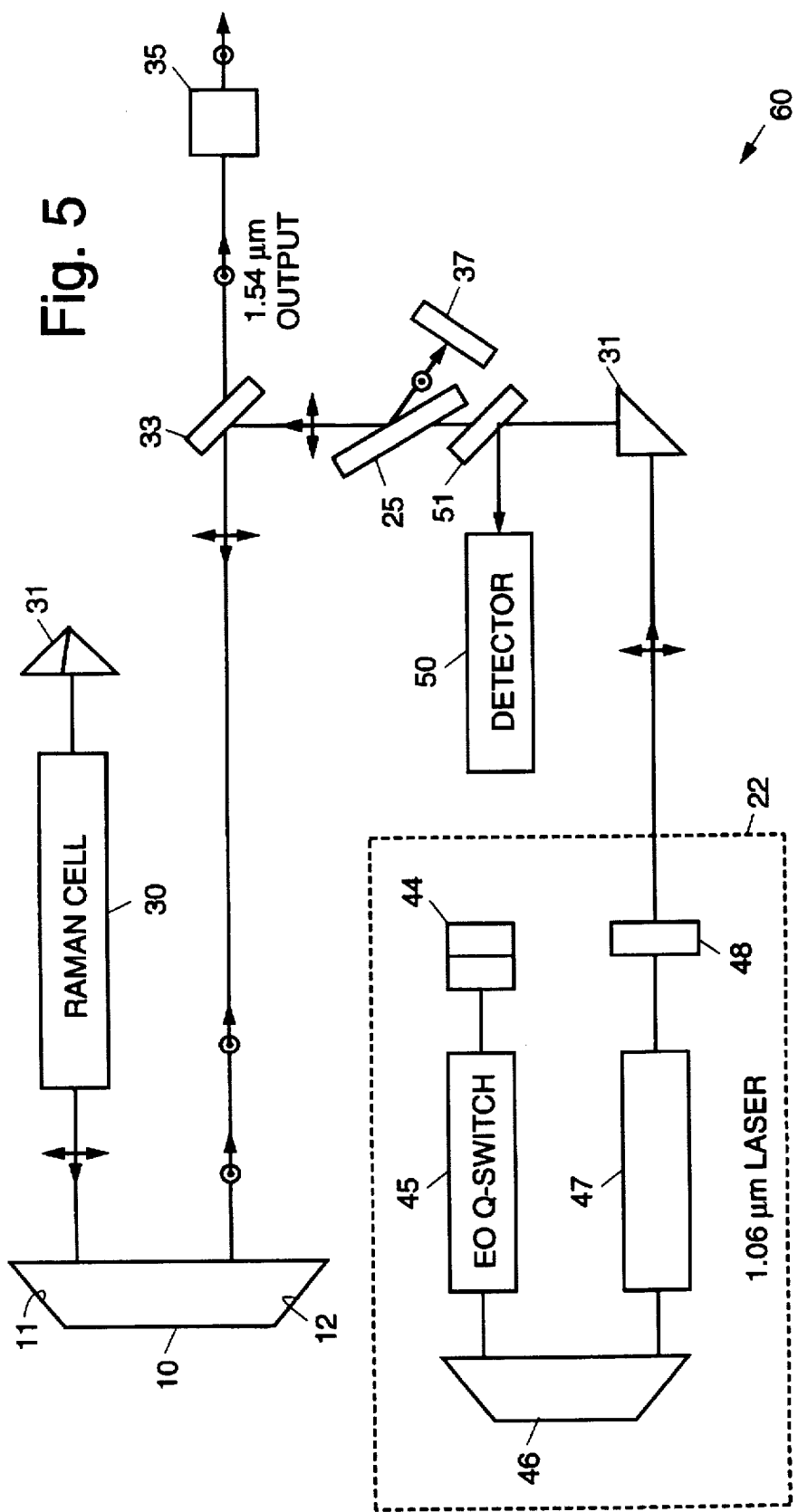

5,726,802

1

BROADBAND QUARTER-WAVE RETARDING 180° FOLD PRISM

BACKGROUND

The present invention generally relates to folding prisms, and more particularly, to a quarter-wave retarding 180° folding prism for use in laser systems.

The prior art relating to the present invention is the use of separate components that provide for a 180° fold and quarter-wave retardation. Use of these multiple components makes the optical design relatively complex and costly.

Recently, a backward Raman laser utilizing a combination of a quarter-wave retarder and a linear polarizer for isolation of the back-reflected pump energy from a pump laser was developed by the assignee of the present invention. This laser is described in U.S. Pat. No. 5,272,717 entitled "Single Focus Backward Raman Laser", which is assigned to the assignee of the present invention. In practical applications of this laser, one or more 180° -fold prisms are also required to turn the laser beam at various points in the optical layout. In addition, quarter-wave retarders that function at more than one wavelength are required in this design (1.06 and 1.54 µm. The common-aperture architecture of this laser, using a polarization switching scheme for the receiver and transmitter, also required a two-color quarter-wave retarder. The use of conventional quarter-wave retarders in combination with fold prisms is relatively complex and costly.

Therefore, it is an objective of the present invention to provide for an improved quarter-wave retarding 180° folding prism for use in laser systems.

SUMMARY OF THE INVENTION

In order to meet the above and other objectives, the present invention comprises a single prism that functions as a 180° fold prism and as a quarter-wave retarder in a laser system. More specifically, the present invention is an optical device comprising a 180° folding glass prism having first and second total internal reflecting surfaces that provides a 90° phase shift of laser energy at a plurality of wavelengths propagating therethrough. The composition of the glass prism is selected so that its refractive index provides a 45° shift at each of first and second total internal reflecting surfaces. Dispersion in the glass is chosen to be small enough so that the phase shift of the laser energy propagating therethrough is relatively insensitive to wavelength. Consequently, the prism also functions as a quarter-wave retarder for the plurality of wavelengths.

The present invention may be used in a variety of laser systems, especially those employing more than one wavelength of light, common-aperture polarization coupled systems, and those where low cost is critical. Examples of such laser systems include SGTS 11, LLDR, EOTS and BSDS.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 illustrates a portion of a laser system employing a quarter-wave retarding 180° folding prism in accordance with the principles of the present invention;

FIG. 1a illustrates a view of the laser system of FIG. 1 taken along the lines 1a—1a;

2

Figure 2:
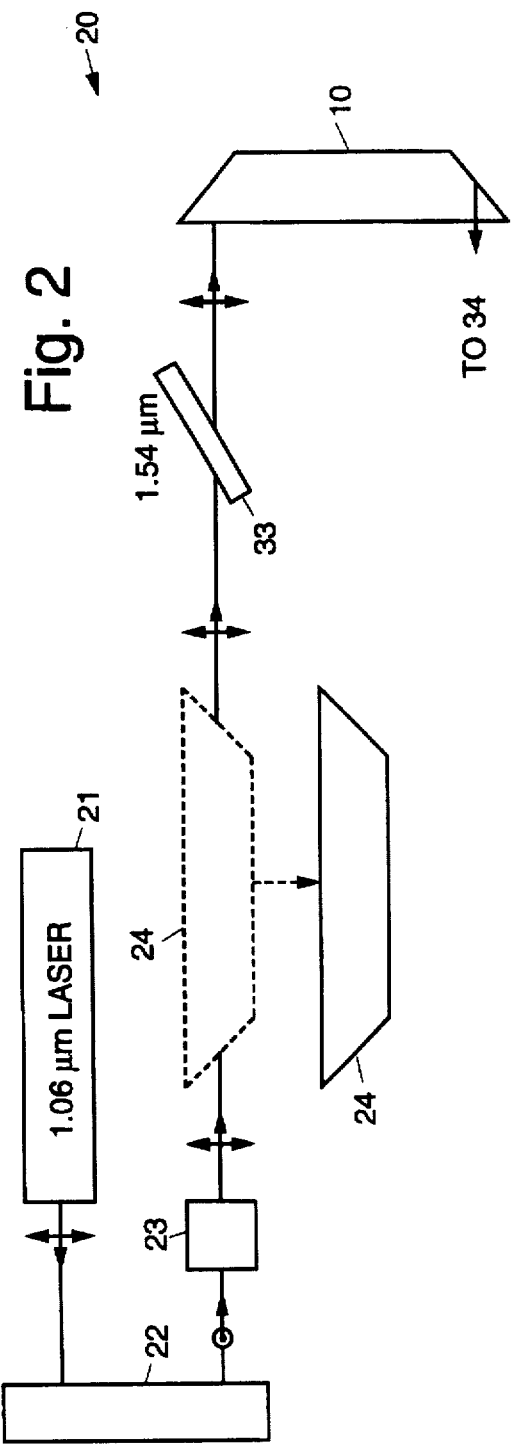
Figure 4:
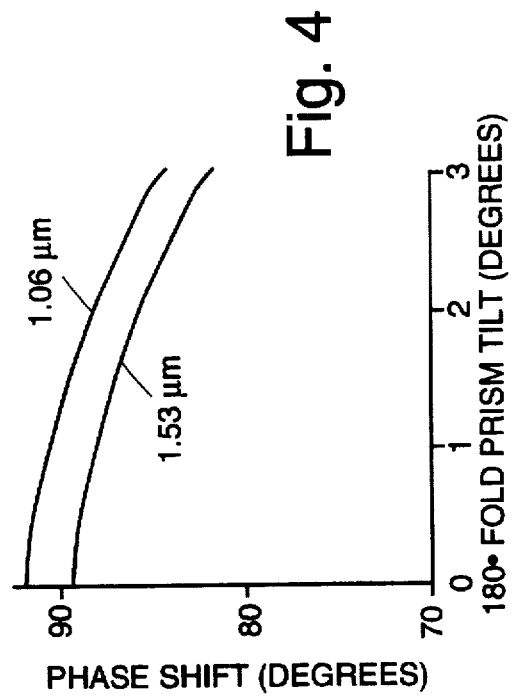
Figure 3:
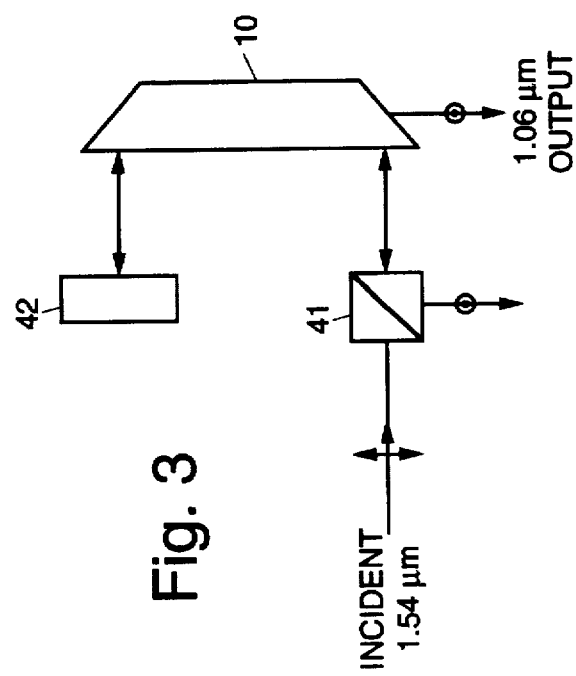

FIG. 2 illustrates a second operational mode of the laser system of FIG. 1 showing use of the quarter-wave retarding 180° folding prism of the present invention;

FIG. 3 shows a test setup that verified the operation and performance of the prism of the present invention;

FIG. 4 shows a graph of relative phase shift of a BaK4 fold prism versus prism tilt angle in the plane of incidence; and FIG. 5 illustrates a breadboard test setup for demonstrating a BaK4 quarter-wave fold prism in accordance with the present invention.

DETAILED DESCRIPTION

Referring to the drawing figures. FIG. 1 illustrates a portion of a backward pulsed Raman laser system 20 developed by the assignee of the present invention that employs an optical device 10 comprising a quarter-wave retarding 180° folding prism 10 in accordance with the principles of the present invention. FIG. 1a illustrates a view of the laser system 20 of FIG. 1 taken along the lines 1a—1a. This laser system 20 is described in U.S. Pat. No. 5,272,717 entitled "Single Focus Backward Raman Laser", the contents of which are incorporated herein by reference.

In practical applications of this laser system 20, one or more 180°-fold prisms were heretofore required to turn the laser beam at various points in the optical layout. In addition, quarter-wave retarders that function at more than one wavelength (1.06 and 1.54 µm) were also required. The common-aperture architecture of the backward pulsed Raman laser system 20, uses a polarization switching scheme for its receiver and transmitter, also required a two-color quarter-wave retarder. The use of the quarter-wave retarding fold prism 10 of the present invention, which provides and combines the functions of a 180-fold and wavelength insensitive quarter-wave retardation in a single fold prism 10, significantly reduces the complexity and cost of the optical design of the laser system 20.

The backward pulsed Raman laser system 20 shown in FIG. 1 comprises a 1.06 µm (Nd:YAG) pump laser 21 whose 1.06 µm output laser beam is linear polarized parallel to the plane of the FIG. 1, and is passed through an optical train in a first direction to a Raman cell 30. The optical train comprises prism 22 tipped at 45° that rotates the plane of polarization of the laser beam to produce a linear polarized beam that is at 90° (relative to the plane of the FIG. 1). The 90° linear polarized beam is passed through a 1.06 µm 90° rotator 23 that rotates the plane of polarization of the laser beam to produce a linear polarized beam that is again parallel to the plane of the FIG. 1. The linear polarized beam is reflected off a first surface of a switching prism 24 through a 1.06 µm thin film polarizer 25, through a 1.06 µm right angle prism 26, through a 1.06 µm 45° rotator 27 that rotates the plane of polarization of the laser beam to produce a linear polarized beam that is at 45° (relative to the plane of the FIG. 1). The beam is then passed through a Raman dichroic beamsplitter 28 and is incident upon, the quarter-wave retarding 180° folding prism 10. With reference to FIG. 1a, the beam passes through the quarter-wave retarding 180° folding prism 10 where it is converted to a circularly polarized beam and is passed into a Raman cell 30. A description of the 1.06 µm to 1.54 µm conversion is included in U.S. Pat. No. 5,272,717, which involves both a Raman cell 30 and a corner cube 31. Both a 1.54 µm and a residual (unconverted part) 1.06 µm beam are returned from the Raman cell 30.

The returned 1.06 µm and 1.54 µm beams are mostly circularly polarized with opposite handedness relative to the input 1.06 μm beam polarization. The circularly polarized beam returned by the Raman cell 30 passes through the quarter-wave retarding 180° folding prism 10 where the polarization state is again rotated to be at 45° relative to the plane of FIG. 1, but 90° relative to the polarization of the first pass. The 45° polarized beam is reflected from the Raman dichroic beamsplitter 28 and is passed through a 1.54 μm 45° rotator 32 and is incident upon an second surface of the switching prism 24. The reflected beam is passed through a 1.54 μm thin film polarizer 33 and through a second quarter-wave retarding 180° folding prism 10. The second quarter-wave retarding 180° folding prism 10 rotates the plane of polarization to produce a circularly polarized beam that is applied to a beam expander 34 which expands the beam to provide a 1.541 μm output beam from the laser system 20. The quarter-wave retarding 180° folding prisms 10 employed in the laser system 20 provide for a combination of quarter-wave retarder and a linear polarizer to isolate back-reflected pump energy from the Raman pump laser 21.

The circularly polarized 1.06 μm beam returned from the Raman cell 30 is passed through the prism 10 and is converted to linearly polarized light with the same orientation as the returned 1.54 μm beam. This beam passes through the dichroic beamsplitter 28, and through the rotator 27 which rotates the polarization of the beam to 90° relative to the plane of FIG. 1. After passing through the right angle prism 26, the 1.06 μm residual beam is reflected by the polarizer 25.

FIG. 2 illustrates a second operational mode of the laser system 20 of FIG. 1 showing use of the quarter-wave retarding 180° folding prism 10 of the present invention. In this second mode, of operation, the switching prism 24 is shifted out of the optical train which causes the 1.06 μm laser beam to be transmitted from the 1.06 μm 90° rotator 23, through the 1.54 μm thin film polarizer 33 through the second quarter-wave retarding 180° folding prism 10 and through the beam expander 34 to produce a 1.06 μm output beam from the laser system 20.

A better understanding of the quarter-wave retarding 180° folding prism 10 will be had from the following. Fresnel rhombs are well-known as quarter-wave retarding prisms, and are described in a book by E. Hecht entitled "Optics", 2nd edition, Addison-Wesley, Reading, Mass., 1989 in Chapter 8, at page 304, for example. However, the Fresnel rhomb does not change a light beam from its original propagation direction, and in many cases, folding the beam is desirable.

Retardation in the Fresnel rhomb as well as the present quarter-wave retarding 180° folding prisms 10 is produced by the relative phase difference between TE polarization (electric field polarization perpendicular to the plane of incidence) and TM polarization (electric field polarization parallel to the plane of incidence) at total internal reflection (TIR) surfaces of the prism 10. The phase shift is a function of incident angle and the refractive index of glass from which the prism 10 is made. For the 180° fold prism 10, obtaining a 90° phase shift is a matter of selecting a glass composition so that its refractive index provides a 45° shift at each of two total internally reflecting surfaces 11, 12 of the prism 10. Normally, the dispersion in glass is small enough so that the phase shift is relatively insensitive to wavelength (and also temperature), and thus the prism 10 functions as a quarter-wave retarder for two or more wavelengths (1.06 μm and 1.54 μm). Thus, although a glass prism quarter-wave retarder is not new (e.g. the Fresnel rhomb), combining a 180° fold with quarter-wave retardation in a single optical device 10 is new.

The relative phase shift caused by total internal reflection between the TE and TM linear electric field polarizations $(\Delta\Phi=\Phi_{TM}-\Phi_{TE})$ is described in a book by M. V. Klein and T. E. Furtak entitled "Optics", 2nd edition, Wiley, New York, 1986 in Chapter 9, at page 641, and is given by the equation:

$$\tan\left(\frac{\Delta\phi}{2}\right) = \left[\frac{\sqrt{n^2\sin^2\theta - 1}}{n}\right] \frac{\cos\theta}{\sin^2\theta} \quad (1)$$

where θ is the angle of incidence, $n=n_t/n_i$, and $n_i$, $n_t$ are the refractive indices of the incident, transmitting media, respectively. For the 180° fold prism 10, θ=45° for both total internally reflecting surfaces 11, 12, and the total phase shift is twice that given by equation (1). Table 1 shows several glasses available from Schott Optical Corporation, for example, that provide approximately 90° total phase. shift when used in fabricating the 180° folding prism 10 at λ=1 to 1.5 μm. The total phase shifts (at the total internally reflecting surfaces 11, 12) at 1.06 μm and 1.53 μm in Table 1 were calculated using equation (1) with θ=45°, $n_i\text{-}n_{glass}$, and $n_t\text{-}n_{air}\text{-}1$. Table 1 is taken from a catalog available from Schott Optical Corporation.

TABLE 1

| Material | Internal Transmittance at 1.53 μm for 25 μm thick | Refractive Indices | | Phase shift (deg) | |
|---|---|---|---|---|---|
| | | 153 μm | 1.06 μm | 153 μm | 1.06 μm |
| SK20 | 0.998 | 1.548 | 1.5487 | 88.52 | 88.70 |
| BaF3 | 0.990 | 1.56295 | 1.56874 | 92.25 | 93.61 |
| BaK1 | 0.990 | 1.55543 | 1.56088 | 90.41 | 91.75 |
| BaK4 | 0.990 | 1.55122 | 1.55693 | 89.35 | 90.79 |
| LF1 | 0.990 | 1.557 | 1.55829 | 90.80 | 91.12 |
| LF5 | 0.995 | 1.55975 | 1.56594 | 91.48 | 92.96 |
| LF6 | 0.998 | 1.552 | 1.55271 | 89.55 | 89.73 |
| LF7 | | 1.5536 | 1 55982 | 89.96 | 91.50 |
| LF8 | | 1.549 | 1 55016 | 88.78 | 89.08 |

Tilting the prism 10 in actual use can affect the polarization phase shifts at the total internally reflecting surfaces 11, 12 thereof. For small angle prism tilts ε in the plane of incidence, $\theta_1 \sim 45°+\epsilon/n_{glass}$ and $\theta_2 \sim 45°-\epsilon/n_{glass}$, where $\theta_{1,2}$ are the respective angles of incidence for the two total internally reflecting surfaces 11, 12. FIG. 3 shows a plot of phase shifts for a BaK4 glass fold prism 10 as a function of prism tilt ε, for λ=1.06 and 1.53 μm. Prisms 10 of this type can easily be held to ≤1° of tilt relative to the laser beam axis.

Analyzing fits perpendicular to the plane of incidence at the total internally reflecting surfaces 11, 12 is significantly more complex because the angle of incidence is a compound angle, and the transverse electric field polarization components of the incident light are not pure TE or TM modes. In practice, tilts in this axis are kept very small since they result in a beam steering of twice the prism tilt angle. Prism tilts parallel to the plane of incidence do not produce angular beam steering.

In a test of a reduced to practice embodiment of the prism 10, 90° phase shift of a BaK4 180° folding prism 10 was verified at 1.54 μm as is shown in the verification test setup shown in FIG. 3. BaK4 glass was used to fabricate the prism 10 since it could be easily obtained. Linearly polarized 1.54 μm from A pulsed Raman laser (not shown) was incident on a linear polarizer cube 41 that is highly transmitting for this polarization, and highly reflective for the orthogonal polarization. The light transmitted through the polarizer 41 was then incident on the BaK4 glass prism 10 whose axis was tipped at 45° relative to plane of the 1.54 μm polarization.

The light transmitted through the prism 10 was then incident on a coated flat mirror 42 with a reflectance of 100% at 1.54 μm. The beam was reflected off the mirror 42 back through the BaK4 prism 10. With a 90° phase shift (single pass), the light returning (second pass) through the prism 10 was linear and orthogonal to the original polarization of the 1.54 μm light. The light reflected back through the prism was totally reflected by the polarizer cube 41. The energy of the reflected light was measured to be 96.4% of the original incident light energy, after accounting for known losses in the optics.

The quarter-wave fold prism 10 was also demonstrated in a breadboard test setup of a SGTS II laser system 60 shown in FIG. 5. The test laser system 60 included, in addition to the components generally described above, an uncoated glass plate 51 used to reflect a portion of the laser beam into a detector 50 for monitoring purposes. Also an absorber 37 was used to absorb the reflected portion of the laser beam reflected from the thin film polarizer 25, as shown. The 1.06 m pump laser 21 is shown in detail and comprises a roof prism 44 at one end, an electro-optical Q-switch 45, a folding prism 46, a laser rod 47 (including flashlamp) and an output coupler 48. The BaK4 prism 10 functioned as a dual wavelength 1.06/1.54 μm quarter-wave retarder which, along with a thin-film polarizer 35, functioned to prevent the backward reflected 1.06 μm light from re-entering the Nd:YAG pump laser 21. The prism 10 also converted the circularly polarized 1.54 μm light, produced in the Raman cell 30 into linearly polarized light. This latter function was necessary for compatibility with a receiver polarization coupling scheme used in the SGTS II laser system 60.

The axis of the BaK4 prism 10 was oriented at 45° as shown, with respect to the incident 1.06 μm linear polarized beam from the pump laser 21, in order to produce equal TE and TM components at the total internally reflecting surfaces 11, 12 of the prism 10. The breadboard laser system 60 yielded a 1.06 μm to 1.54 μm Raman conversion efficiency of about 30%.

The 1.5 μm linear polarizer 35 was used to analyze the 1.54 μm output beam. With the corner cube reflector 31 in the backward Raman cell 30, about 85% of the 1.54 μm output light energy was in the expected linear polarization state. Using a flat mirror reflector (not shown), this increased to 93%. The corner cube 31 is a greatly depolarizing element, so the reduced polarization coupling efficiency in that case was expected. The observed polarization coupling efficiency is acceptable for an eyesafe laser system of this type.

Thus there has been described a new and improved quarter-wave retarding 180° folding prism for use in laser systems. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An optical device comprising:

a 180° folding glass prism having first and second total internal reflecting surfaces that provides a 90° phase shift of laser energy at a plurality of wavelengths that propagate therethrough and wherein its composition is selected so that its refractive index provides a 45° shift at each of the first and second total internal reflecting surfaces of the prism and wherein dispersion in the glass is small enough so that the phase shift of the laser energy is relatively insensitive to wavelength, whereby the prism also functions as a quarter-wave retarder for the plurality of wavelengths of laser energy.

2. The optical device of claim 1 wherein the glass prism comprises SK20 type glass.

3. The optical device of claim 1 wherein the glass prism comprises BaF3 type glass.

4. The optical device of claim 1 wherein the glass prism comprises BaK1 type glass.

5. The optical device of claim 1 wherein the glass prism comprises BaK4 type glass.

6. The optical device of claim 1 wherein the glass prism comprises LF1 type glass.

7. The optical device of claim 1 wherein the glass prism comprises LF5 type glass.

8. The optical device of claim 1 wherein the glass prism comprises LF6 type glass.

9. The optical device of claim 1 wherein the glass prism comprises LF7 type glass.

10. The optical device of claim 1 wherein the glass prism comprises LF8 type glass.

* * * * *